Jan. 17, 1939.    R. SHEPPARD    2,144,550
EXTRACTION TURBINE CONTROL SYSTEM
Filed May 5, 1938
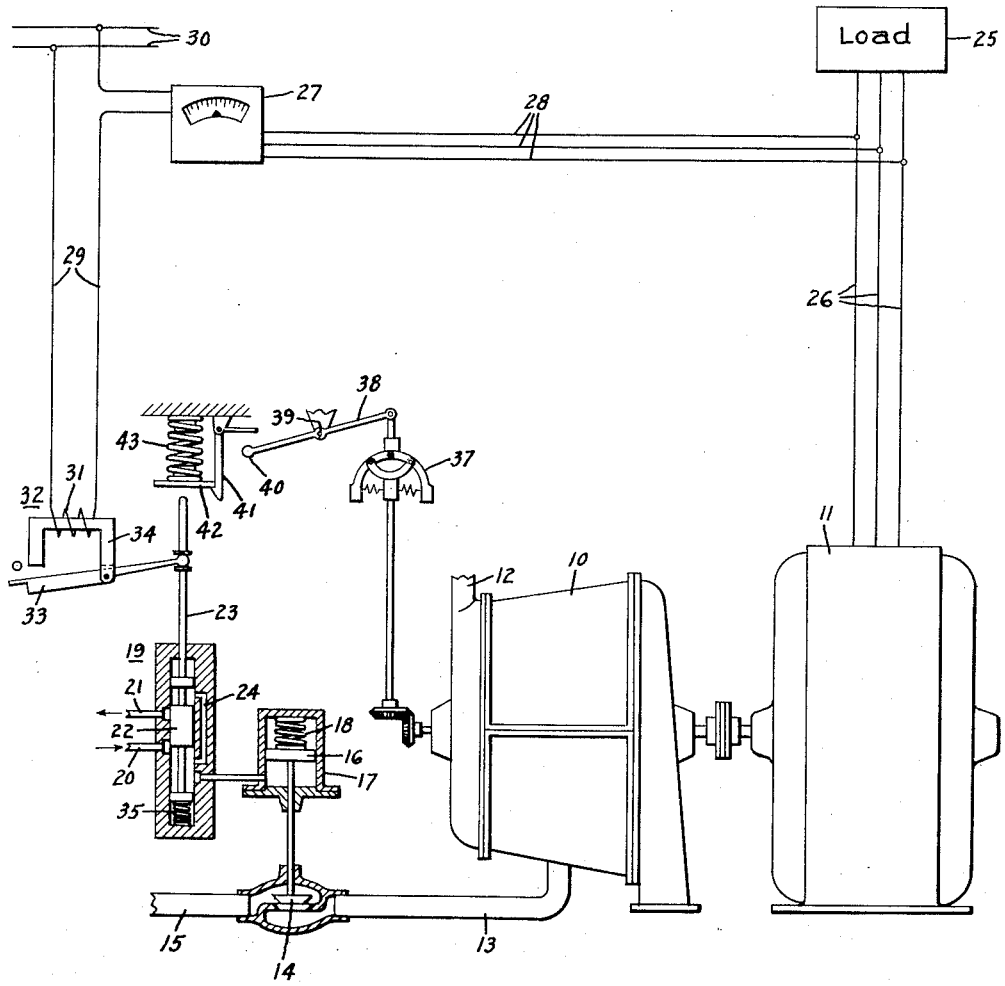
Inventor:
Raymond Sheppard,
by Harry E. Dunham
His Attorney.

Patented Jan. 17, 1939

2,144,550

UNITED STATES PATENT OFFICE 2,144,550

EXTRACTION TURBINE CONTROL SYSTEM

Raymond Sheppard, Niskayuna, N. Y., assignor to General Electric Company, a corporation of New York Application May 5, 1938, Serial No. 206,368

4 Claims. (Cl. 290—2)

The present invention relates to extraction turbine arrangements, and more specifically to the type of extraction turbines in which the flow of extraction fluid through the extraction conduit is uncontrolled. It has been customary to provide a throttle valve in the extraction conduit to reduce pressure fluctuations of the extraction fluids discharged therefrom. If such extraction turbine is used in conjunction with a system subject to considerable load fluctuations, that is, changes in demand for mechanical load output from the turbine, as is often the case when the turbine is arranged to drive a generator connected to an electric line, it becomes desirable to reduce the flow of extraction fluid preferably completely to close the throttle valve in that conduit in response to certain load conditions.

The object of my invention is to provide an improved extraction turbine arrangement whereby the throttle valve in the extraction conduit is closed upon a certain increase in demand for mechanical load output from the extraction turbine. With the closing of the extraction throttle valve all of the elastic fluid is passed from the extraction stage through the lower stages and the mechanical load output of the lower stages is accordingly increased. The closing of the throttle valve upon a certain load increase may be accomplished in various ways, for instance, in response to a predetermined drop in the frequency of the electrical output of the generator driven by the turbine or turbine speed.

For a better understanding of what I believe to be novel and my invention, attention is directed to the following description and the claims appended thereto in connection with the accompanying drawing.

The single figure of the drawing shows an extraction turbine arrangement embodying my invention.

The arrangement comprises an extraction turbine 10 connected for driving an alternating current generator 11, the turbine having an inlet conduit 12 and an extraction conduit 13. The flow of elastic fluid through the inlet conduit 12 to the turbine is controlled in a known manner by valve means, not shown. The extraction conduit 13 includes a throttle valve 14 which is normally held in an intermediate position to maintain substantially constant the pressure in the discharge conduit 15 receiving fluid from the extraction conduit 13.

In accordance with my invention, means are provided for automatically closing the throttle valve 14 upon the occurrence of certain conditions. In the present instance the stem of the throttle valve 14 is connected to a piston 16 of a hydraulic motor 17. The piston is biased downwardly by a compression spring 18. Actuating fluid under pressure is supplied to the lower part of the hydraulic motor cylinder by means of a pilot valve 19 which has an inlet port 20 and a discharge port 21. The flow of actuating fluid through these ports is controlled by a pilot valve head 22 provided on the stem 23. In the position indicated, actuating fluid may be supplied through the inlet port 20 of the pilot valve to the hydraulic motor 17. When the pilot valve head 22 is moved downward to uncover the discharge port 21 and to cover the inlet port 20, actuating fluid is discharged from the hydraulic motor 17 through the discharge port 21 of the pilot valve. Communication between the discharge port 21 and the hydraulic cylinder is established by means including a by-pass 24 within the pilot valve cylinder.

The valve head 22 of the pilot valve 19 is adapted to be adjusted in accordance with predetermined conditions of the load connected to the turbine. As indicated in the drawing, the generator 11 may be connected to any suitable load 25 through conductors 26. As is well known in the art, an abnormal increase of the load tends to reduce the frequency of the alternating current energy supplied thereto, hence the frequency of the supply may be used as an indication of the load. A contact making frequency meter 27, connected across the conductors 26 by leads 28, is arranged for completing an operating circuit 29 upon a predetermined decrease in frequency indication. The circuit 29 connected to a suitable source of supply 30 includes an energizing coil 31 of an electro-magnetic operator 32. Upon the energization of the solenoid 31 in response to a predetermined drop in frequency of the generator output, the armature 33 pivotally mounted upon one leg of the core structure 34 will be lifted causing a downward movement of the armature extension loosely connected to the pilot valve stem 23. Thus, upon a predetermined drop in frequency of the generator output, the pilot valve head 22 will be moved downwardly to effect the closing of the throttle valve 14. As the speed of the turbine 10 is subsequently increased to normal and the output frequency of the generator 11 restored to its normal condition, the electro-magnetic operator 32 is deenergized and due to the biasing force of the spring 35 provided in the lower end of the cylinder of the pilot valve 19, the valve head 22 will be raised to its previous position. Actuating fluid will be supplied to the operating motor 17 and the throttle valve 14 in the extraction conduit will be reopened to allow elastic fluid to be supplied to the conduit 15.

If the load 25 connected to the generator 11 is suddenly reduced, or thrown off, it becomes desirable to close the throttle valve in the extraction conduit because the pressure in the extraction stage under such condition is considerably reduced which would permit back flow of fluid in the extraction conduit 13. This is accomplished by the provision of a safety governor 37 which is driven from the turbine shaft and pivotally connected to the right end of a lever 38 which has an intermediate point held on a fulcrum 39 and a left-hand end 40 in cooperative relation with a latch 41. The latch 41 normally engages a plate 42 secured to the lower end of a spring 43 and holds such spring in a compressed condition. The spring plate 42 is arranged in proximity to the upper end of the pilot valve stem 23.

During operation a sudden increase in speed causes, through the speed governor, clockwise rotation of the lever 38 about the fulcrum 39 whereby the left end 40 of the lever is forced upwardly. As the speed reaches a certain maximum value, the left end 40 engages the latch 41 and removes it from the spring plate 42. The plate is accordingly forced downwardly into engagement with the pilot valve stem 23 and causes reversing of the pilot valve position resulting in closing movement of the throttle valve 14.

Having described the method of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In combination, an extraction turbine, an alternating current generator driven thereby, an extraction conduit extending from said turbine, a throttle valve in said extraction conduit, means for normally maintaining said throttle valve in a fixed position and means for automatically closing said throttle valve upon a predetermined increase in speed and as the alternating current frequency of said electrical generator decreases beyond a predetermined minimum value.

2. In combination, an alternating current generator, an elastic fluid turbine for driving said generator, an extraction conduit extending from said turbine, a throttle valve in said extraction conduit, means for normally holding said throttle valve in a predetermined opened position and means for actuating said throttle valve toward a closed position upon a predetermined decrease in the frequency of the output of said alternating current generator.

3. In combination, an alternating current generator for supplying a variable load, a turbine for driving said generator, a conduit for extracting elastic fluid from an intermediate stage of said turbine, a throttle valve in said conduit, means for normally maintaining said throttle valve in an opened position, means for automatically closing said throttle valve upon a predetermined increase in speed of said turbine, a contact-making means responsive to the frequency of the alternating current output of said generator, and electromagnetic actuating means adapted to be energized by said contact-making means upon a predetermined decrease in the frequency of said generator output, said actuating means being operatively connected for closing said throttle valve upon the energization thereof.

4. In combination, an alternating current generator for supplying a variable load, an elastic fluid turbine for driving said generator, an extraction conduit extending from said turbine, a throttle valve in said conduit, means for normally maintaining said throttle valve in a predetermined opened position, means for closing said throttle valve upon a predetermined increase in speed of said turbine, means responsive to a predetermined decrease in the frequency of said generator output for closing said throttle valve and means for restoring said throttle valve to the opened position upon the normal frequency of said generator output obtaining.

RAYMOND SHEPPARD.